J. A. SHEARER.
SPRING SUSPENSION DEVICE FOR VEHICLES.
APPLICATION FILED JULY 3, 1914.
1,129,743.
Patented Feb. 23, 1915.
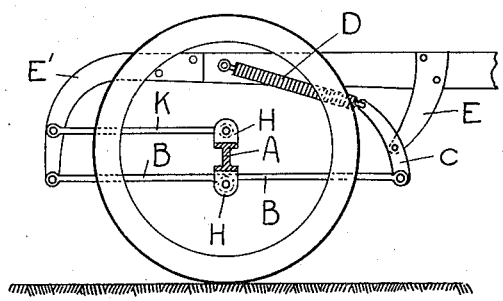
WITNESSES:
Chas. A. Leibman.
P. D. Rollhaus
INVENTOR
John Alexander Shearer.
BY
ATTORNEYS.

UNITED STATES PATENT OFFICE.

JOHN ALEXANDER SHEARER, OF PARKSIDE, SOUTH AUSTRALIA, AUSTRALIA.

SPRING SUSPENSION DEVICE FOR VEHICLES.

1,129,743.  Specification of Letters Patent.  Patented Feb. 23, 1915.

Original application filed March 12, 1913, Serial No. 753,725. Divided and this application filed July 3, 1914. Serial No. 848,768.

*To all whom it may concern:*

Be it known that I, JOHN ALEXANDER SHEARER, blacksmith, a subject of the King of Great Britain and Ireland, residing at Glen Osmond Road, Parkside, State of South Australia, Commonwealth of Australia, have invented a certain new and useful Spring Suspension Device for Vehicles, of which the following is a specification.

The application is a divisional application of that of my application Serial Number 753,725 filed 12th March 1913.

This invention relates to the suspension or mounting of the frame of a motor car or other vehicle or traveling machine upon its axles by means of levers connected with the axle and pivoted to the frame and adapted to be moved against the action of a spring or springs when said axle is raised relatively to the frame or chassis so as to absorb the shock or jar caused by the passage over rough roads or over irregularities or obstacles and the object of this invention is to provide an improved construction of this nature which will more efficiently prevent the transmission of shock or jar to the frame of the car, vehicle or machine.

According to my present invention each end of the axle is attached to the pivotally connected adjacent inner ends of two longitudinal and approximately horizontal links the outer end or ends of one or both of which is or are pivotally connected to the frame of the car, vehicle or machine by a lever and spring device which tends to keep the links as nearly as possible in a straight line and to restore them thereto after displacement. There are two links, one in front and one behind, with a lever and spring device at each end of the axle. As the wheel passes over an obstruction the axle rises relatively to the frame and carries with it the adjacent inner ends of the links, the outer ends of the links being drawn together horizontally in opposition to the pull of the spring device and without any direct lift of the frame.

In order that my invention may be the more clearly understood I will describe the same with reference to the accompanying drawing in which the figure represents a side view showing the end of a single axle and portion of a frame with my suspension device, showing also a supplementary link to prevent any rocking of the axle.

As shown in the drawing the axle A is attached to the pivotally connected adjacent inner ends of two approximately horizontal links B B; the outer end of the one link is pivotally attached direct to the bracket E' secured to and projecting downward from the frame of the car, vehicle or machine, and the outer end of the other link is pivotally attached to the lower end of the lever C pivoted at about its center to a similar bracket E and having its upper end connected to the frame by a spring D or set of springs. The axle is attached to the connecting pin of the links by a suitable bracket or clip H, and the several pivoted attachments may be made by turned pins or bolts and if desired with ball bearings. The supplementary link K equal in length to the adjacent link B is pivotally attached to the bracket E' at the one end and to the axle clip H at the other and acts with the adjacent link B as parallel guide links to prevent the axle from rocking backward or forward. The brackets E E' may be integral with the side bars of the car, vehicle or machine or they may be riveted or otherwise suitably secured thereto. The effect of this method of suspension is that the wheels and the axle, in passing over an obstruction or any unevenness in the road, are able to move up and down without transmitting any concussion or jar to the frame. The axle A and the adjacent inner ends of the links B B move upward, the action being that of toggle links, the outer ends of the links move horizontally inward rocking the lever C on its pivot and distorting the spring D practically without lifting the lever vertically and consequently without lifting the frame. The spring in recovering from its distortion restores the lever to its vertical position and the links to their horizontal position.

Having now fully described and ascertained my said invention and the manner in which it is to be performed I declare that what I claim is:—

1. An improved suspension device for vehicles comprising, near each end of the axle, two longitudinal and aproximately horizontal links, the adjacent inner ends of which are pivotally connected together and to the axle and the outer end of one link being pivotally attached to a bracket secured to and projecting downward from the frame of the vehicle, the outer end of the other link being pivotally attached to the lower end of an approximately vertical lever pivoted at about its center to a second bracket, and the upper end of the lever being connected to the frame by a spring connection tending to maintain the two links in a horizontal position.

2. The combination with a vehicle frame and an axle, of a suspension means comprising toggle links connected with the axle at their common center of movement, so that vertical movements of the axle will shift the point of connection with the links, a spring having connection with one of the links, to oppose movement of the latter by the axle, and an additional link connected with the axle and a relatively fixed part of the frame.

3. In a vehicle, a frame, an axle, toggle links connected at their common center of movement with the axle and extending oppositely therefrom, one of said links being pivotally connected at its outer end with a rigid member of the frame, a lever, to one end of which the outer end of the other link is pivotally connected, said lever being fulcrumed between its ends on a member of the frame, a retractile spring connected at one end with the other end of the lever, the opposite end of the spring being secured to the frame, and an additional link substantially parallel with one of said toggle links and of approximately the same length as said toggle link, one end of the additional link being pivotally secured to the frame and the opposite end being pivotally secured to the axle.

In testimony that I claim the foregoing as my invention I have signed my name in the presence of two subscribing witnesses this twenty-sixth day of May 1914.

JOHN ALEXANDER SHEARER.

Witnesses:
ARTHUR GORE COLLISON,
LIONEL CLIFTON PASH.